United States Patent
Filho et al.

(10) Patent No.: US 9,868,521 B2
(45) Date of Patent: Jan. 16, 2018

(54) RETRACTABLE SELF-ALIGNING AIRCRAFT STABLIZER STRUT ASSEMBLY AND AIRCRAFT INCLUDING THE SAME

(71) Applicant: EMBRAER S.A., São José dos Campos - SP (BR)

(72) Inventors: Carlos Rogulski Filho, São Jose dos Campos (BR); Claudio De Martino, São Jose dos Campos (BR); Mario Tadeu Crema, São Jose dos Campos (BR); Andreas Michael Eckert, São Jose dos Campos (BR)

(73) Assignee: EMBRAER S.A., São Jose Dose Campos—SP (BR)

( * ) Notice: Subject to any disclaimer, the term of this patent is extended or adjusted under 35 U.S.C. 154(b) by 181 days.

(21) Appl. No.: 14/995,561

(22) Filed: Jan. 14, 2016

(65) Prior Publication Data

US 2017/0203835 A1    Jul. 20, 2017

(51) Int. Cl.
*B64C 1/20* (2006.01)
*B64C 25/62* (2006.01)
*B64D 9/00* (2006.01)
*B64C 25/10* (2006.01)

(52) U.S. Cl.
CPC ............. *B64C 25/62* (2013.01); *B64D 9/00* (2013.01); *B64C 25/10* (2013.01)

(58) Field of Classification Search
CPC ......... B64C 25/10; B64C 25/16; B64C 25/18; B64C 25/20; B64C 25/22; B64C 25/24; B64C 25/62; B64C 2025/125; B64C 1/22
See application file for complete search history.

(56) References Cited

U.S. PATENT DOCUMENTS

| | | | | |
|---|---|---|---|---|
| 2,385,891 A | * | 10/1945 | Swanson ............... | B64C 25/505 188/317 |
| 3,332,661 A | * | 7/1967 | Hand .................... | B65D 90/14 254/423 |
| 4,378,098 A | * | 3/1983 | Evans ..................... | B64C 1/22 244/102 R |
| 4,593,871 A | * | 6/1986 | Nichols .................. | B64C 1/22 244/118.1 |
| 8,714,480 B2 | * | 5/2014 | Prud'Homme-Lacroix | B64C 25/10 244/102 R |

(Continued)

*Primary Examiner* — Richard G Davis
(74) *Attorney, Agent, or Firm* — Nixon & Vanderhye P.C.

(57) ABSTRACT

Self-aligning retractable strut stabilization assemblies that are ground engageable in use are provided to stabilize a vehicle, e.g., a cargo aircraft during loading/unloading operations. The strut stabilization assembly may be on-board equipment associated with an aircraft that may be actuated (e.g., via on-board hydraulic and/or electric actuation systems) by the aircraft operator so as to stabilize the aircraft during certain ground operations, e.g., cargo and/or personnel loading/unloading operations. A laterally separated pair of centering mechanisms are attached to the main strut and define a zero-spring bias load state corresponding to an aligned condition of the main strut. Displacement of the main strut out of the aligned condition responsively causes at least one centering mechanism to exert a spring-biased load in an opposite direction of the displacement causing the at least one centering mechanism to return to the zero-spring bias load state thereby returning the main strut to the aligned condition thereof.

16 Claims, 10 Drawing Sheets

(56) References Cited

U.S. PATENT DOCUMENTS

2006/0237584 A1\* 10/2006 Hinton ................... B64C 25/12
  244/102 R
2009/0014582 A1\* 1/2009 De Ruffray ............. B64C 25/18
  244/102 R \* cited by examiner

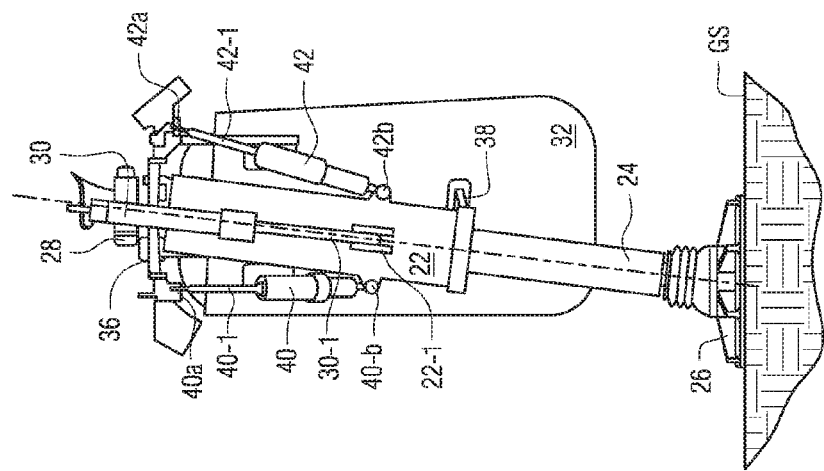
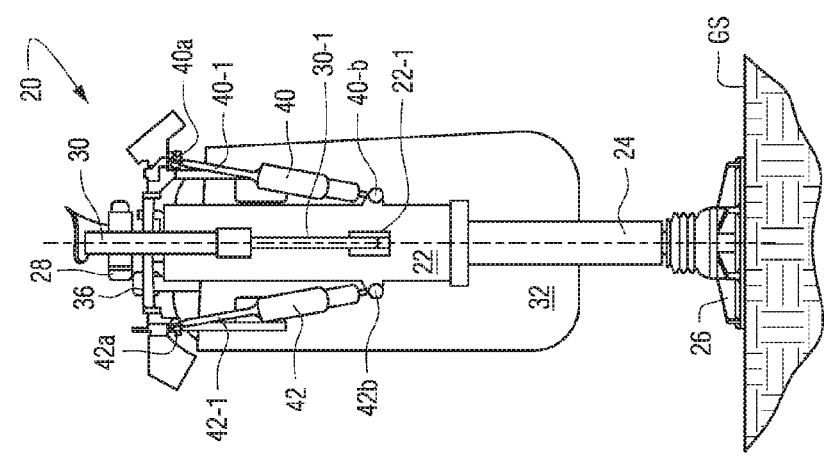
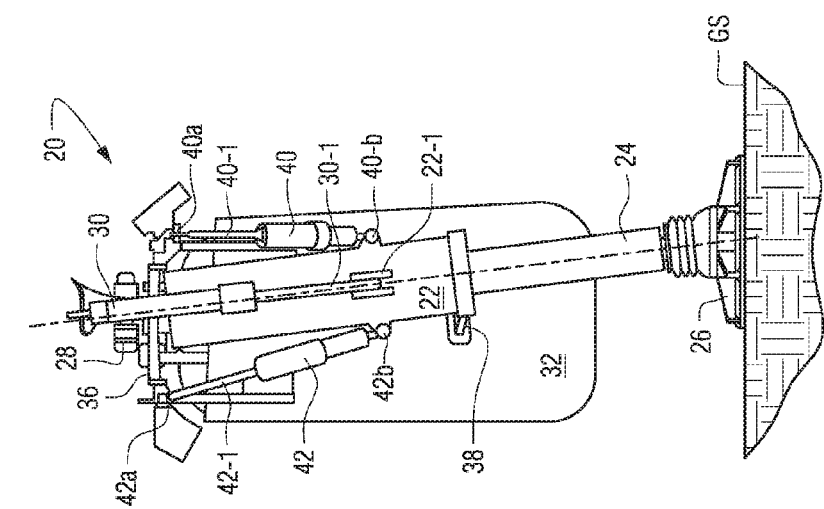

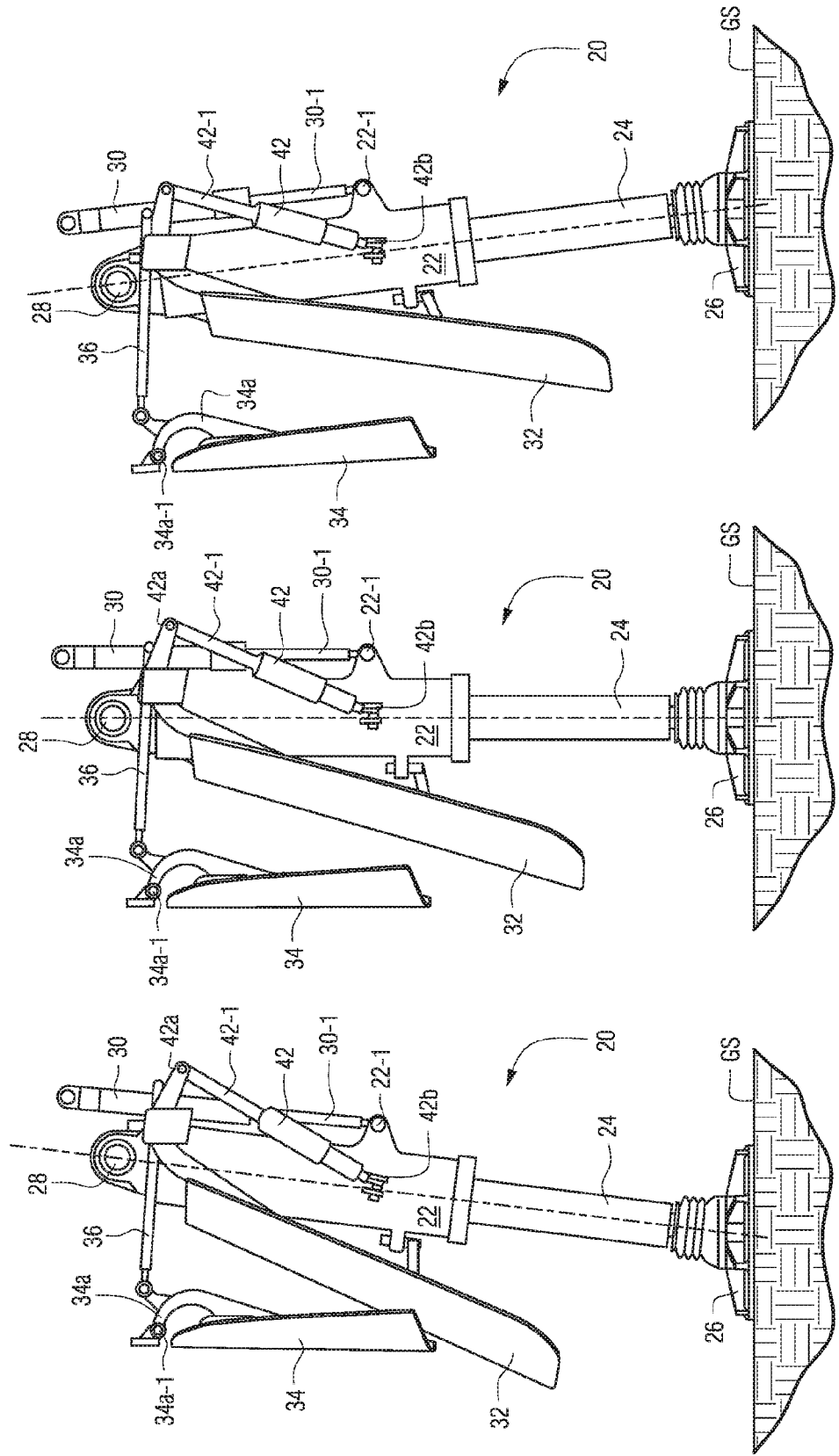

RETRACTABLE SELF-ALIGNING AIRCRAFT STABLIZER STRUT ASSEMBLY AND AIRCRAFT INCLUDING THE SAME

FIELD

The embodiments disclosed herein relate generally to retractable aircraft stabilization struts for stabilizing an aircraft fuselage, e.g., at either the tail or the front of the fuselage, during ground-based loading/unloading operations.

BACKGROUND

Cargo aircraft typically have a center of gravity (CG) that is typically forward of the main landing gear. There may thus be a tendency during loading/unloading applications for those aircraft equipped with rear cargo ramps for the aircraft to shift about the main landing gear assembly which in turn raises the aircraft nose. In extreme situations, aircraft shifting during loading/unloading could cause a severe tail strike damaging the airframe and/or exposing personnel to injury hazard. For these reasons, it is advisable for cargo aircraft to include additional tail ground-stabilization aft of the main landing gear during loading/unloading operations.

A variety of aircraft tail stabilization assemblies are generally known. For example, tail stabilization assemblies are known which are positionally fixed and consist of a fixed support that is typically associated with ground-based equipment manually placed under the aircraft. As can be appreciated such fixed stabilization assemblies require the pre-positioning of the ground based equipment as well as a substantial time to install thereby prolonging the loading/unloading operation, each being an obvious disadvantage if the cargo aircraft is being loaded/unloaded in an active combat zone.

On-board stabilization systems which may be mechanically or manually operated are also known. For example telescopic strut stabilization systems are know that usually employ on-board hydraulic and/or electric actuators. Telescopic strut stabilization systems typically include a main strut and a retraction actuator as the same component.

An on-board tail jack assembly is also known from U.S. Pat. No. 4,593,871, the entire content of which is expressly incorporated hereinto by reference, which includes a manually activated hydraulic jack system and a strut that may be operatively fixed to the jack system. The operator may thus extend/retract the strut as may be needed to stabilize the tail. However, when not in use, the strut must be physically disconnected from the jack and stored remotely (e.g., as part of the tail stairwell).

Retractable strut stabilization systems are also know which employ hydraulic and/or electric actuators so as to be capable of deployment between a stowed condition within a strut bay of the aircraft fuselage and an extended condition whereby the strut stabilizes the aircraft tail. Such retractable stabilization systems will typically be equipped with a strut door which can be manually operated or actuated by a mechanism linked to the stabilizer or by a dedicated door actuator.

Retractable strut stabilization systems however are problematic to operate in the event that the strut is not aligned with the strut bay during retraction. That is, when a retractable strut stabilization system is deployed during an aircraft loading/unloading operation, side loads can be experienced which can cause the strut to become off-centered or misaligned with the strut bay. If the strut is then attempted to be retracted into the strut bay while off-centered or misaligned, it could become jammed thereby precluding operation of the aircraft.

What has been needed in the art, therefore, are retractable strut assemblies that have a self-aligning mechanism to address the problems associated with the strut being off-centered or misaligned as a result of the aircraft loading/unloading operations. As such, a self-alignable retractable strut assembly would provide a measure of safety and reliability for the cargo aircraft operations. It is towards fulfilling such needs that the embodiments of the invention herein are directed.

SUMMARY

The embodiments disclosed herein are generally directed toward self-aligning retractable strut stabilization assemblies that are ground engagement in use to stabilize a vehicle, e.g., a cargo aircraft during loading/unloading operations. In certain embodiments, the strut stabilization assembly will be on-board equipment associated with an aircraft that may be actuated (e.g., via on-board hydraulic and/or electric actuation systems) by the aircraft operator so as to stabilize the aircraft during certain ground operations, e.g., cargo and/or personnel loading/unloading operations.

According to some embodiments, therefore, an aircraft is provided with an on-board self-aligning strut stabilization assembly which is moveable between a retractable position wherein the strut stabilization assembly is housed within a strut bay of the aircraft, and an extended position wherein the strut stabilization assembly is in ground-engaging contact to stabilize an aft portion of the aircraft. The strut stabilization assembly will advantageously include a main strut pivotally connected to supporting structure of the aircraft for pivotal movements between the extended and retracted positions thereof, a strut extension member operatively associated with the main strut for movements between a retracted state and a ground-engaging extended state, an actuator operatively connected to the main strut for moving the main strut and the strut extension member operatively associated therewith between the extended and retracted positions, and a pair of laterally separated double-acting spring-biased centering mechanisms each having one end pivotally attached to the supporting structure of the aircraft and an opposite end attached to the main strut.

In preferred embodiments, the centering mechanisms will each define a zero-spring bias load state corresponding to an aligned condition of the main strut such that a displacement of the main strut out of the aligned condition responsively causes at least one centering mechanism to exert a spring-biased load in an opposite direction of the displacement causing the at least one centering mechanism to return to the zero-spring bias load state thereby returning the main strut to the aligned condition thereof. The centering mechanisms may comprise extendible extension posts having a terminal end pivotally attached to the supporting structure of the aircraft.

The strut extension member may be telescopically received within the main strut for reciprocal rectilinear movements between the retracted and ground-engaging states thereof. A ground-engageable foot pad may advantageously be connected to a terminal end of the strut extension member.

A main strut door may operatively be connected to the main strut for covering the strut assembly when stowed in the strut bay. A main strut door linkage may be provided to operatively link the main strut door to the main strut so as to cause the main strut door to move from between opened and closed states in response to the main strut being pivotally moved between the extended and retracted positions thereof. A secondary strut door may also be provided in which case a linkage yoke operatively mechanically links the secondary strut door the main strut door so that the main and second strut doors are slaved to one another for movements between opened and closed states thereof.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

FIGS. 8-10 are aft-facing elevational views of the kinematic ranges of motion for the self-aligning strut assembly in accordance with an embodiment of the invention that may occur during lateral displacements of the aircraft;

FIGS. 11-13 are lateral-facing elevational views of the kinematic ranges of motion for the self-aligning strut assembly in accordance with an embodiment of the invention that may occur during longitudinal (forward and aft) displacements of the aircraft;

DETAILED DESCRIPTION

Figure 1:
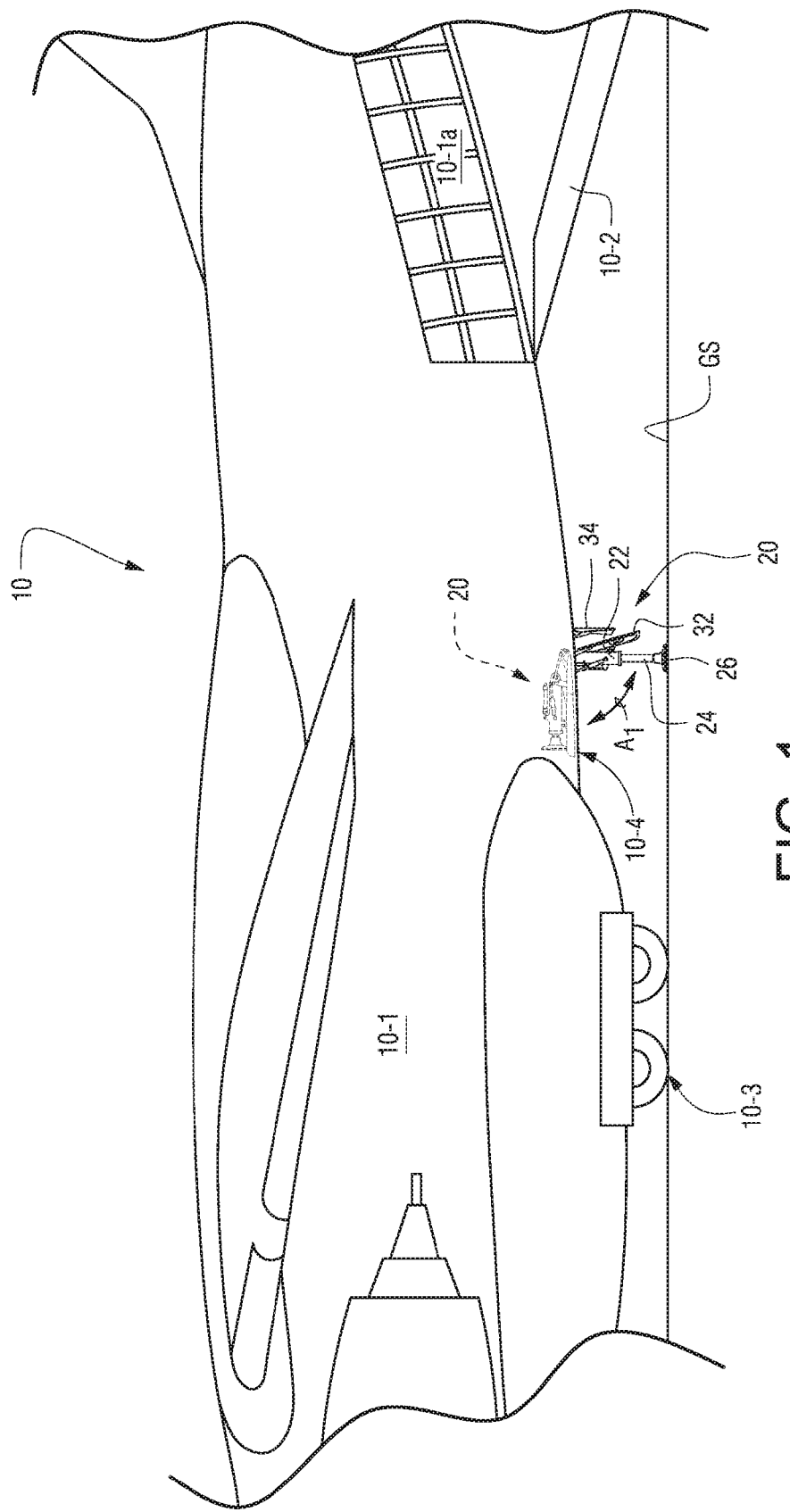
FIG. 1 is a partial side elevational view of a cargo aircraft which includes a retractable self-aligning stabilization strut assembly in accordance with an embodiment of the invention.

Accompanying FIG. 1 depicts a cargo aircraft 10 in which an embodiment of a self-aligning stabilization strut assembly 20 according to the invention may operationally be employed. The exemplary cargo aircraft 10 includes a fuselage 10-1 having an aft main cargo ramp 10-2 which is shown in an opened condition to allow cargo to be physically loaded into the cargo space 10-1 a within the fuselage 10-1.

Figure 2:
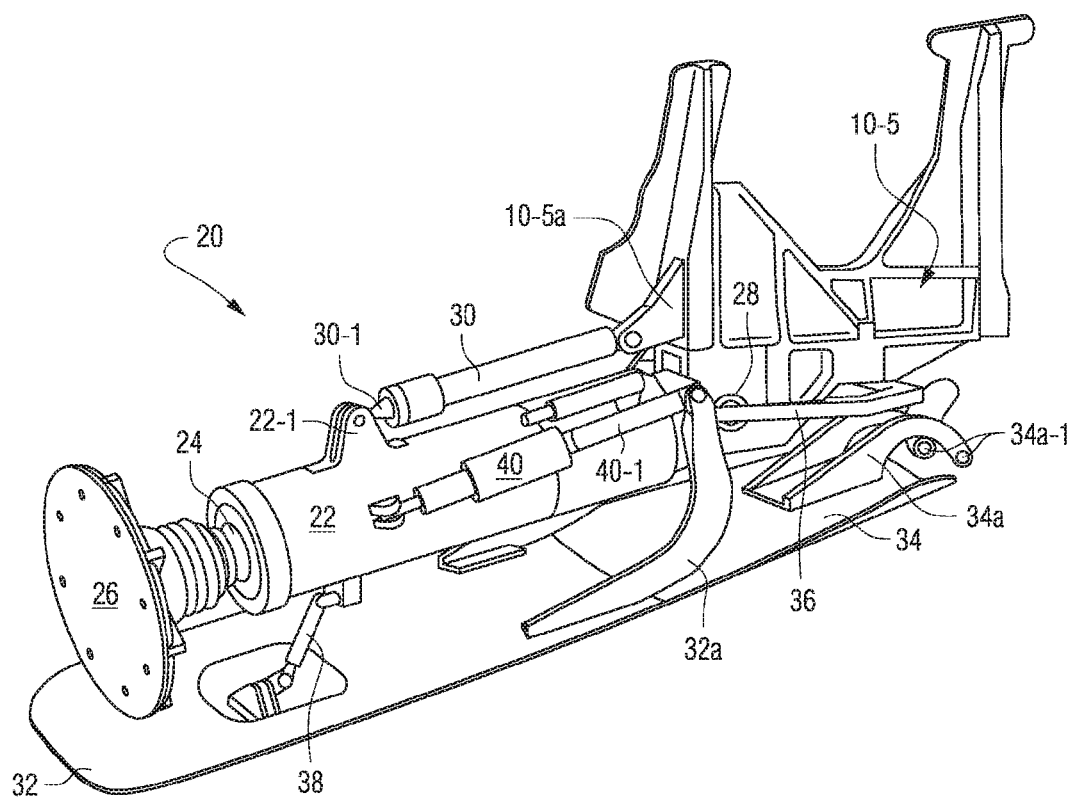
FIG. 2 is a detailed perspective view of the retractable self-aligning stabilization strut assembly in accordance with an embodiment of the invention shown in a retracted position.
Figure 3:
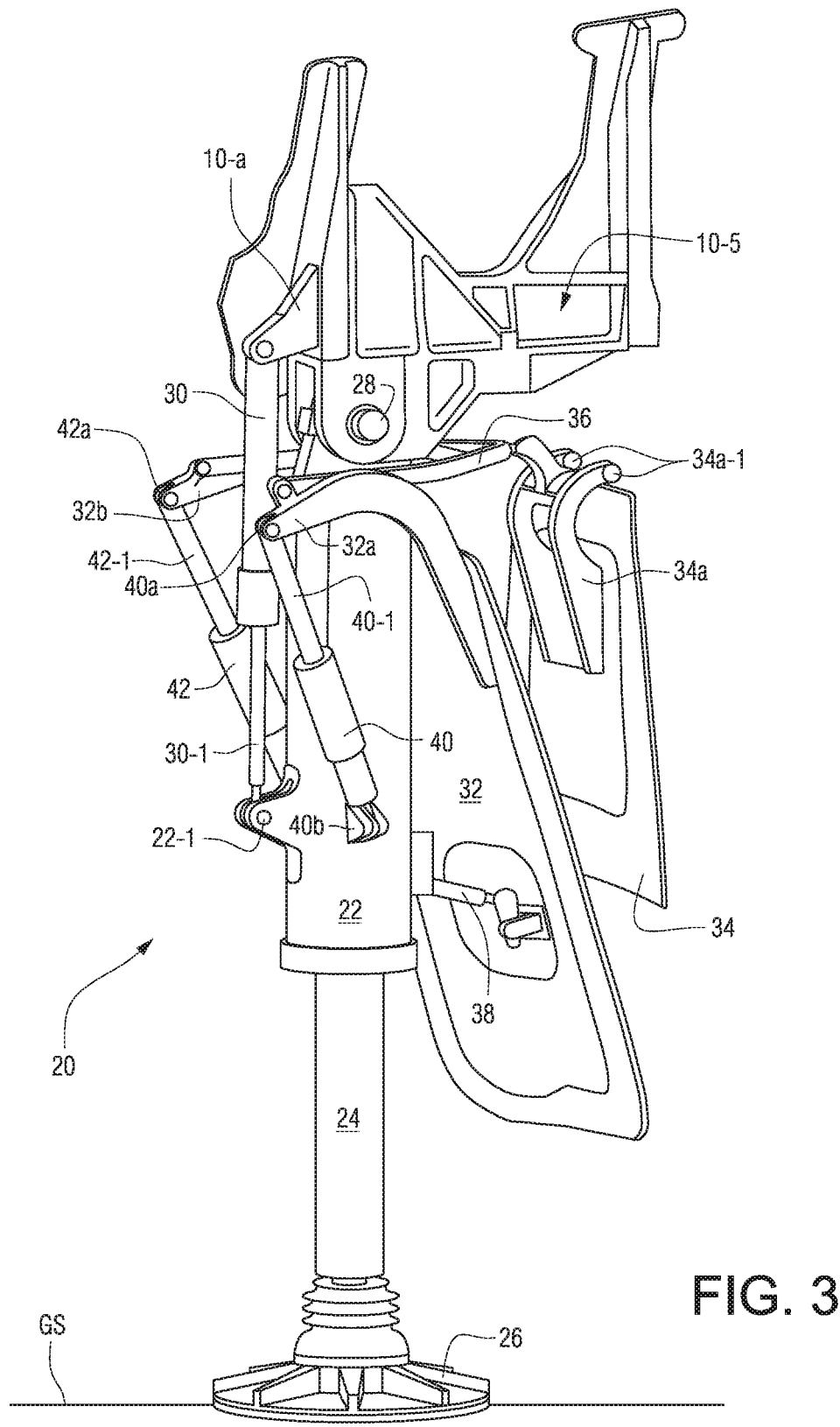
FIG. 3 is detailed perspective view of the self-aligning stabilization strut assembly in accordance with an embodiment of the invention shown in an extended position.

The stabilization strut assembly 20 is pivotally moveable into and out of a strut bay 10-4 within the fuselage 10-1 of the aircraft 10 by way of suitable hydraulic and/or electric actuators (see, e.g., actuator 30 depicted, for example, in FIGS. 2 and 3). For example, as is depicted in solid line in FIG. 1, the stabilization strut assembly 20 is shown as being in an extended and operational position aft of the aircraft main landing gear assembly 10-3 in engagement with the ground surface GS to thereby stabilize the aft portion of the aircraft fuselage 10-1 when cargo is loaded/unloaded via the ramp 10-2 when opened. When the cargo loading/unloading operation is complete, however, the cargo ramp 10-2 may be closed and the strut assembly 20 pivotally moved (arrow A1) into a retracted position within the strut bay 10-4 of the fuselage 10-1 as shown in dashed line in FIG. 1. Conversely, in preparation for a loading/unloading operation, the stabilization strut assembly 20 may be pivotally moved (arrow A1) from its stowed position within the strut bay 10-4 and into an operative ground-engaging position as will be described in greater detail below.

Accompanying FIGS. 2 and 3 depict the self-aligning strut stabilization assembly 20 disembodied from the aircraft 10 in its retracted and extended positions, respectively. The strut stabilization assembly is generally comprised of main strut 22 which includes a strut extension member 24 which in the embodiment depicted is telescopically received within the main strut 22 and thereby reciprocally rectilinearly extendible (e.g., via suitable hydraulic and/or electrical actuation (not shown)) between a retracted state as shown in FIG. 2 and an extended ground-engaging state as shown in FIG. 3. The terminal end of the strut extension member 24 includes a foot pad 26 that is adapted to engage the ground surface GS when the strut extension member 24 is in its extended condition as shown in FIG. 3 to provide load transmission from main strut 22 to the ground surface GS.

The upper end of the main strut 22 is pivotally connected to supporting structure 10-5 of the aircraft fuselage 10-1 by a pivot pin assembly 28. A hydraulically or electrically activated actuator 30 is pivotally connected at one end to a support boss 10-5a of the supporting structure 10-5 and includes an extensible actuator piston 30-1 connected pivotally at its terminal end to a connection lug 22-1 associated with the main strut 22.

The strut assembly 22 is also provided with main and secondary strut doors 32, 34, respectively. The main strut door 32 includes a pair of laterally separated main door hinges 32a, 32b. The second strut door 34 is supported by a support bracket 34b which is connected to the fuselage 10-1 of the aircraft 10 by pivot pints 34a-1. A door linkage yoke 36 pivotally interconnects the main door hinges 32a, 32b to the secondary door support bracket 34a. A strut door linkage arm 38 is pivotally connected at one end to the main strut 22 and at an opposite end thereof to the main door 32 so as to operatively link the main strut 22 to the main door 32. Movement of the main strut 22 between its retracted and extended positions will therefore responsively cause the main strut door to be moved between its closed and opened conditions by virtue of the interconnection therebetween provided by the linkage arm 38. The mechanical linkage between the main strut door 32 and the secondary strut door 34 provided by way of the door linkage yoke 36 will concurrently cause the secondary strut door 34 to be moved between its closed and opened positions.

The strut assembly 20 also includes a laterally separated pair of spring-biased centering mechanisms 40, 42 each having an extension post 40-1, 42-1 being journally connected at its terminal end 40a, 42a to a proximal end of the main door hinges 32a, 32b. The mechanisms 40, 42 are also journally connected at an end opposite to the ends 40a, 42a to the lateral connection lobes 40b, 42b of the main strut 22, respectively. (Only connection lobe 40b is visible in FIG. 3, but see for example FIGS. 8-11.) Each of the centering mechanisms 40, 42 houses a double-acting spring cartridge (not shown) having a nominal length corresponding to a centered position both laterally and longitudinally relative to the longitudinal axis of the aircraft fuselage 10. When the strut assembly 20 is in a longitudinally and vertically aligned (centered) position, therefore, each of the centering mechanisms will define a nominal length whereby a zero-spring bias load is presented. Lateral and/or longitudinal movements of the main strut 22 (e.g., that may occur during loading/unloading operations of the aircraft 10 when the strut extension 24 is in engagement with the ground surface GS) will cause extension and/or retraction the extension posts 40-1 and/or 42-1 which in turn responsively changes the nominal length of at least one of the double acting spring cartridges associated with the centering mechanisms 40 and/or 42, respectively. This change in the nominal spring length will thereby in turn cause a spring-bias load to be generated in an opposite direction that encourages the extension posts 40-1 and/or 42-1 to return to their nominal or centered zero-spring bias load state.

Figure 4:
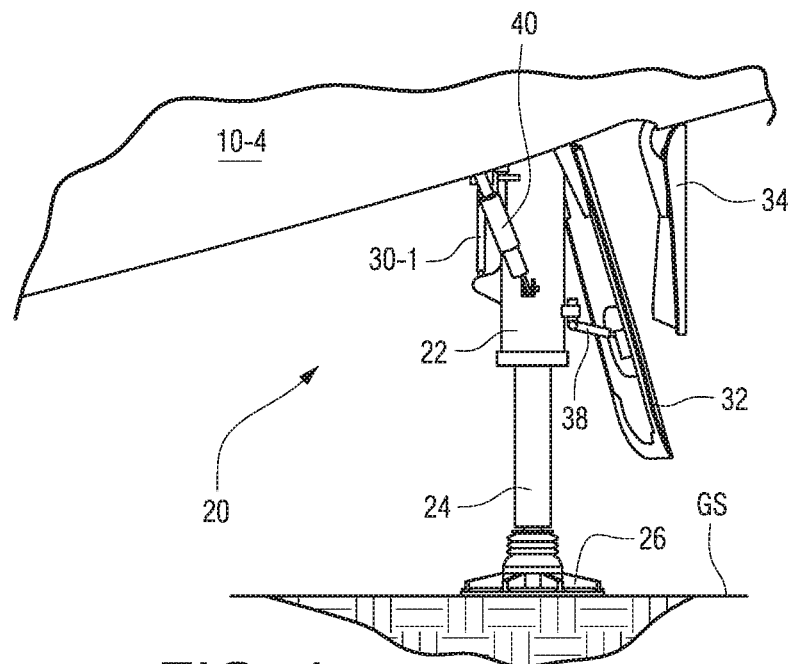
FIGS. 4-7 show an operational sequence whereby the self-aligning stabilization strut assembly is retracted from its extended operational position (FIG. 4) and into a retracted position whereby the strut assembly is housed within the strut bay (FIG. 7)
Figure 5:
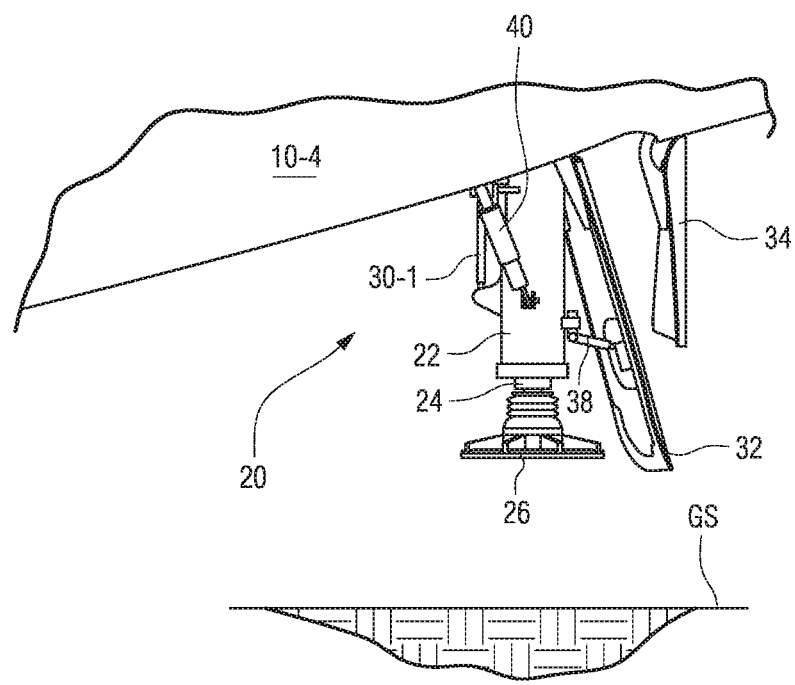
Figure 6:
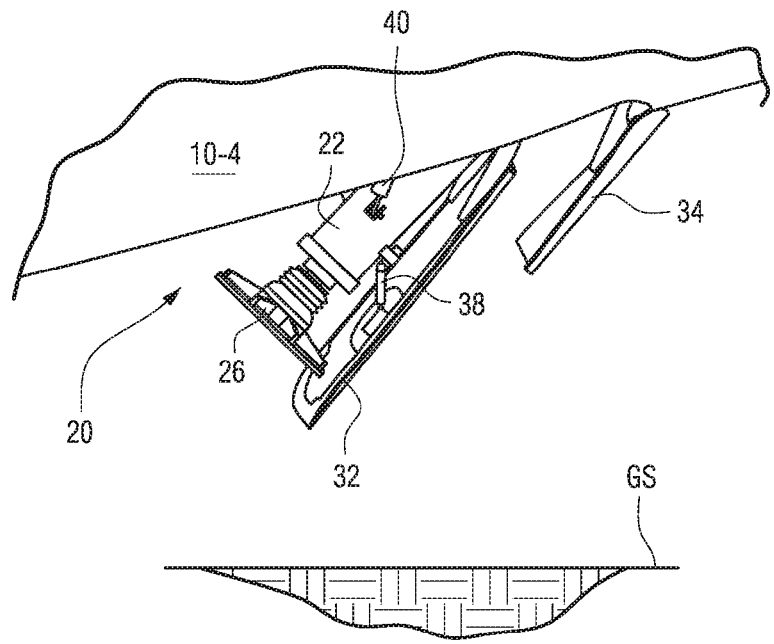
Figure 7:
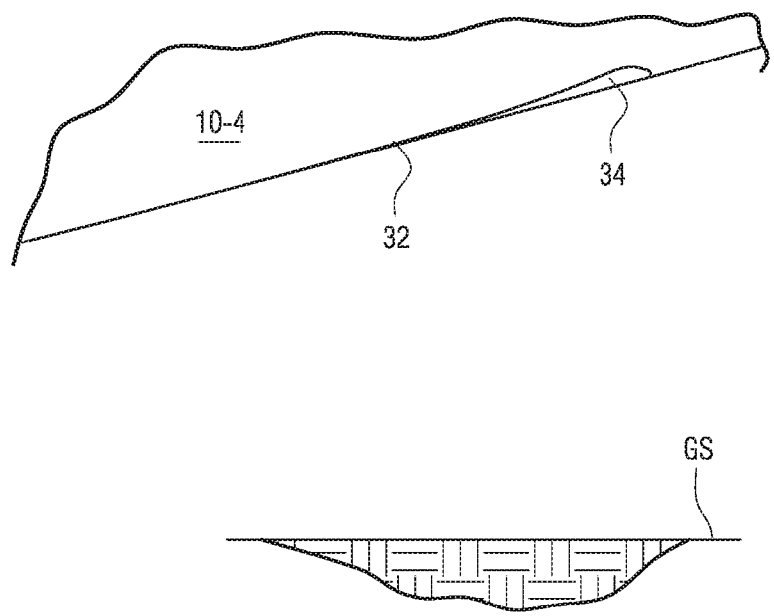

Accompanying FIGS. 4-7 depict an operational sequence to retract the strut assembly 20 into the strut bay 10-4 of the aircraft fuselage 10-1. When in the extended position as shown in FIG. 4, the strut extension member 24 will need to initially be retracted by operation of on-board hydraullically electrically activated actuation systems (not shown) operatively associated with the main strut 22. The retracted state of the strut extension member 24 relative to the main strut 22 is depicted in FIG. 5. Thereafter, actuation of the actuator 30 associated with the main strut 22 will therefore cause the actuator arm 30-1 to retract thereby responsively causing the main strut 22 to be pivotally moved about the pivot pin assembly 28. Pivotal movement of the main strut 22 about the pivot pin assembly 28 also responsively cause the main and secondary strut doors 32, 34, respectively, to follow due to the mechanically slaved linkage thereby provided by the main strut door linkage yoke 36 and main strut door linkage arm 38. An intermediate state of the strut retraction is depicted in FIG. 6. Continued retraction of the main strut 22 will therefore cause it to be fully housed within the strut bay 10-4 whereby the main and secondary strut doors 32, 34, respectively are flush with the exterior skin of the fuselage 10-1. Such a fully retracted state of the strut assembly 20 is depicted in FIG. 7. As can be appreciated, when in the retracted position as shown in FIG. 7, actuation of the actuator 30 will therefore cause the actuator arm 30-1 to extend thereby responsively causing the main strut 22 to be pivotally moved about the pivot pin assembly 28 into the extended position as shown in FIG. 4, i.e., in an operational sequence opposite to that depicted sequentially by FIGS. 4-7.

Figure 14:
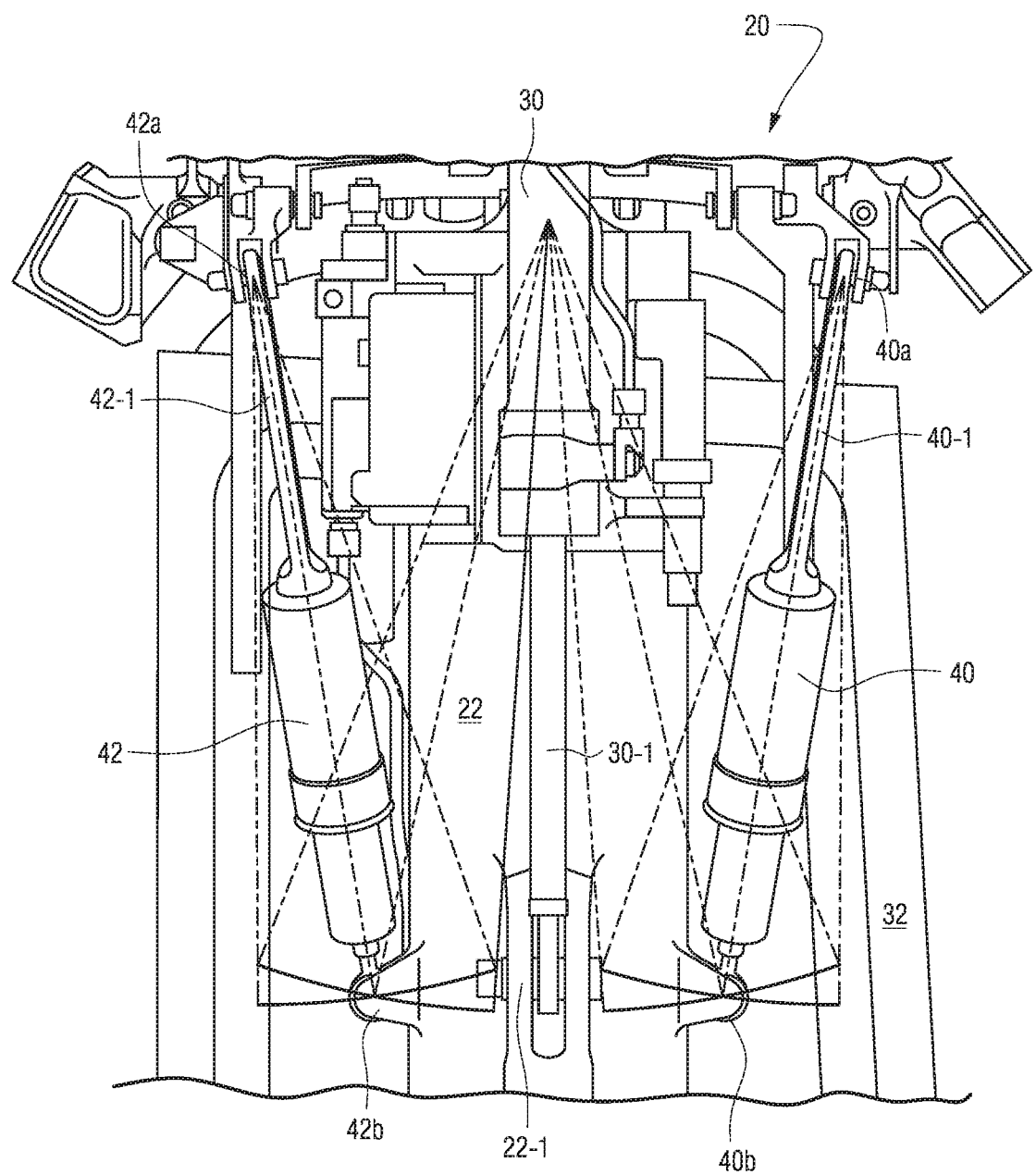
FIG. 14 is a detailed view of the freedoms of motion for the strut stabilization assembly and associated centering mechanism.
Figure 15:
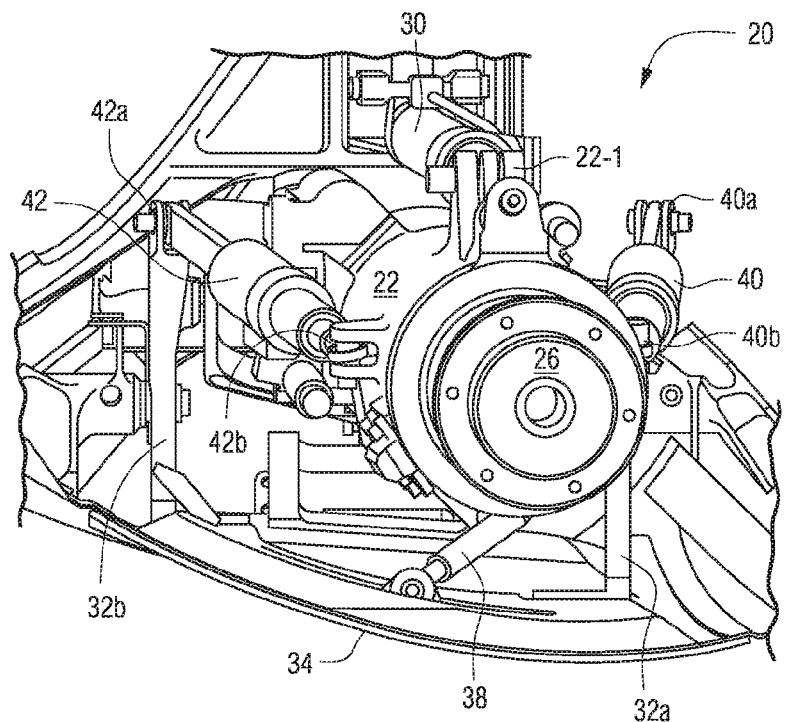
FIGS. 15-18 are end views of the self-aligning strut assembly in accordance with an embodiment of the invention showing self-alignment when retracted.
Figure 16:
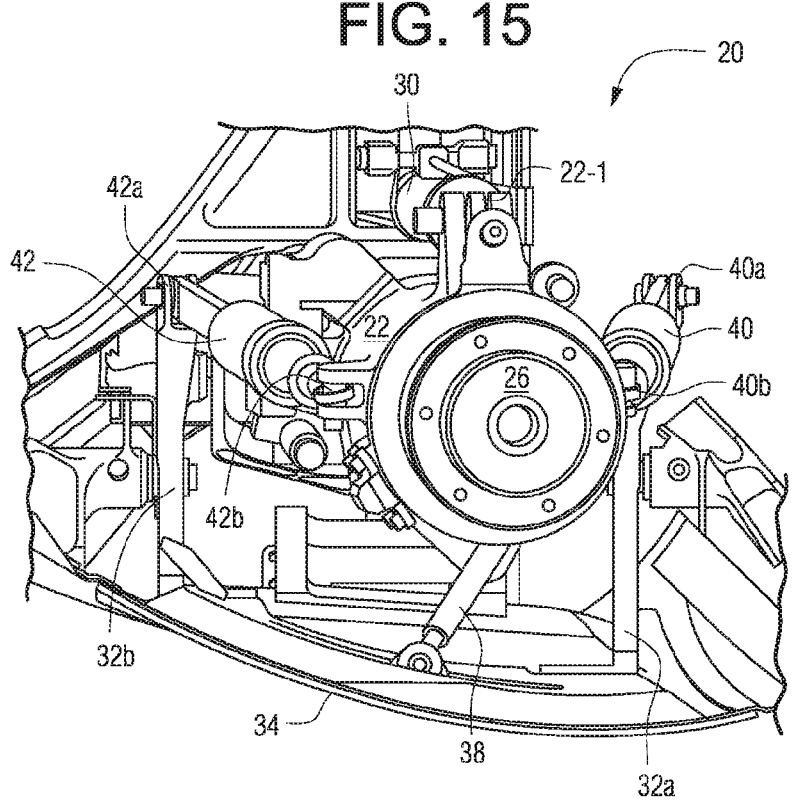
Figure 17:
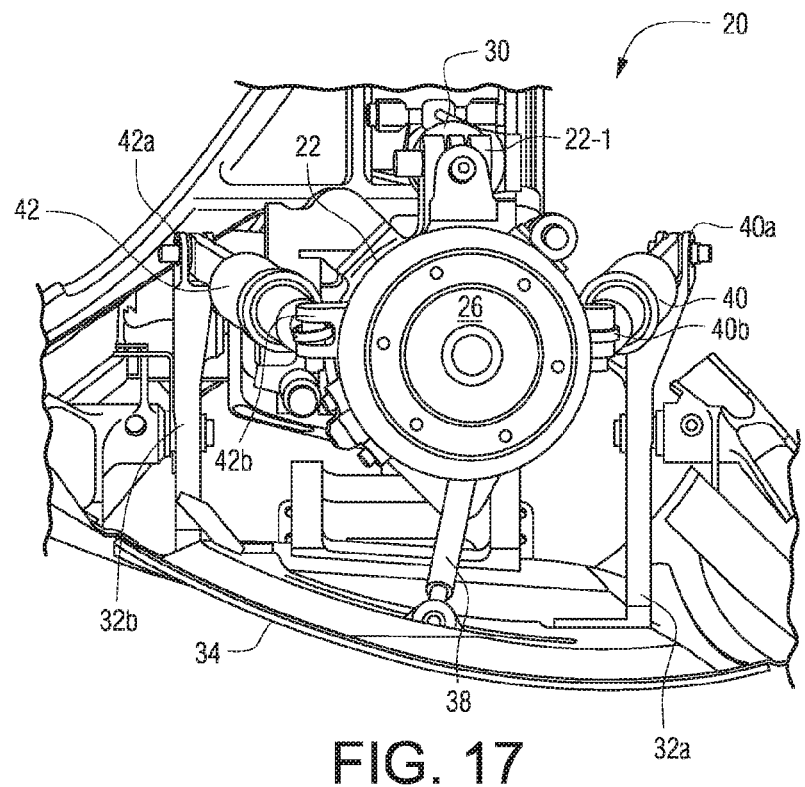
Figure 18:
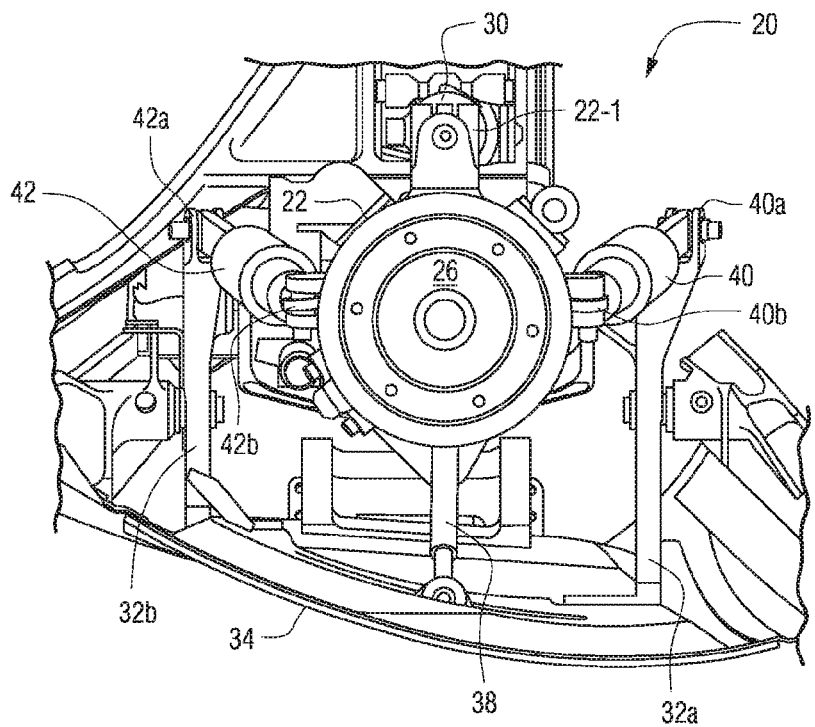

FIGS. 8-10 are aft-facing elevational views of the kinematic ranges of motion for the self-aligning strut assembly 20 that may occur during lateral displacements of the aircraft, it being appreciated that FIG. 9 shows the assembly 20 in a longitudinally aligned (centered) state. FIGS. 11-13 on the other hand are lateral-facing elevational views of the kinematic ranges of motion for the self-aligning strut assembly 20 that may occur during longitudinal (forward and aft) displacements of the aircraft, it being appreciated that FIG. 12 shows the assembly 20 in a vertically aligned (centered) state. It will be noted that the journal connections of the actuator 30 and centering mechanisms 40, 42 have sufficient play so as to allow predetermined degrees of misalignment relative to the aircraft's longitudinal and vertical axes. Such angular misalignments that are permitted by any of the journal connections of the actuator 30 and centering mechanisms 40, 42 are also depicted by the dashed lines of FIG. 14, whereby the solid lines thereof depict the assembly 20 in a longitudinally and vertically aligned state.

Accompanying FIGS. 15-18 depict an end view of the strut assembly 20 showing how the centering mechanisms 40, 42 serve to physically return the main strut 22 to its aligned (centered) state to allow full retraction thereof into the strut bay 10-4 of the fuselage 10-1.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A self-aligning retractable strut stabilization assembly comprising:
    a main strut pivotally connectable to supporting structure for pivotal movements between extended and retracted positions;
    a main strut door having a hinge which allows pivotal movement of the main strut door between open and closed conditions in response to the main strut being pivotally moved between the extended and retracted positions thereof, respectively;
    a strut extension member operatively associated with the main strut for movements between a retracted state and a ground-engaging extended state;
    an actuator operatively connected to the main strut for moving the main strut and the strut extension member operatively associated therewith between the extended and retracted positions; and
    a pair of laterally separated double-acting spring-biased centering mechanisms each having one end pivotally attachable to the hinge of the main strut door and an opposite end attached to the main strut, wherein
    the centering mechanisms each define a zero-spring bias load state corresponding to an aligned condition of the main strut such that a displacement of the main strut out of the aligned condition responsively causes at least one centering mechanism to exert a spring-biased load in an opposite direction of the displacement causing the at least one centering mechanism to return to the zero-spring bias load state thereby returning the main strut to the aligned condition thereof.

2. The strut stabilization assembly as in claim 1, wherein the strut extension member is telescopically received within the main strut for reciprocal rectilinear movements between the retracted and ground-engaging states thereof.

3. The strut stabilization assembly as in claim 2, further comprising a ground-engageable foot pad connected to a terminal end of the strut extension member.

4. The strut stabilization assembly as in claim 1, wherein the centering mechanisms comprise extendible extension posts having a terminal end pivotally attachable to the supporting structure.

5. The strut stabilization assembly as in claim 1, wherein one end of the hinge of the main strut door is pivotally connected to the supporting structure and an opposed end thereof is fixed to the main strut door.

6. The strut stabilization assembly as in claim 5, further comprising a main strut door linkage operatively linking the main strut door to the main strut so as to cause the main strut door to move between opened and closed states thereof in response to the main strut being pivotally moved between the extended and retracted positions thereof.

7. The strut stabilization assembly as in claim 6, further comprising a secondary strut door, and a linkage yoke operatively mechanically linking the secondary strut door the main strut door.

8. A vehicle which comprises the strut stabilization assembly as in claim 1.

9. The vehicle of claim 8, wherein the vehicle is an aircraft.

10. An aircraft comprising an on-board self-aligning strut stabilization assembly which is moveable between a retracted position wherein the strut stabilization assembly is housed within a strut bay of the aircraft, and an extended position wherein the strut stabilization assembly is in ground-engaging contact to stabilize an aft portion of the aircraft, wherein the strut stabilization assembly comprises:
 a main strut pivotally connected to supporting structure of the aircraft for pivotal movements between the extended and retracted positions thereof;
 a main strut door having a hinge which allows the main strut door to pivotally move between an open and closed conditions wherein the strut bay is exposed and covered in response to the main strut being pivotally moved between the extended and retracted positions thereof, respectively;
 a strut extension member operatively associated with the main strut for movements between a retracted state and a ground-engaging extended state;
 an actuator operatively connected to the main strut for moving the main strut and the strut extension member operatively associated therewith between the extended and retracted positions; and
 a pair of laterally separated double-acting spring-biased centering mechanisms each having one end pivotally attached to the hinge of the main strut door and an opposite end attached to the main strut, wherein the centering mechanisms each define a zero-spring bias load state corresponding to an aligned condition of the main strut such that a displacement of the main strut out of the aligned condition responsively causes at least one centering mechanism to exert a spring-biased load in an opposite direction of the displacement causing the at least one centering mechanism to return to the zero-spring bias load state thereby returning the main strut to the aligned condition thereof.

11. The aircraft as in claim 10, wherein the strut extension member is telescopically received within the main strut for reciprocal rectilinear movements between the retracted and ground-engaging states thereof.

12. The aircraft as in claim 11, wherein the strut stabilization assembly further comprises a ground-engageable foot pad connected to a terminal end of the strut extension member.

13. The aircraft as in claim 10, wherein the strut stabilization assembly further comprises a main strut door operatively connected to the main strut for covering the strut assembly when stowed in the strut bay.

14. The aircraft as in claim 13, wherein the centering mechanisms comprise extendible extension posts having a terminal end journally attached to a proximal end of the hinge of the main strut door.

15. The aircraft as in claim 14, further comprising a main strut door linkage operatively linking the main strut door to the main strut so as to cause the main strut door to move from between opened and closed states in response to the main strut being pivotally moved between the extended and retracted positions, thereof.

16. The aircraft as in claim 15, further comprising a secondary strut door, and a linkage yoke operatively mechanically linking the secondary strut door the main strut door to thereby concurrently move both the main and second strut doors between opened and closed conditions relative to the strut bay.

* * * * *